United States Patent Office 3,093,450
Patented June 11, 1963

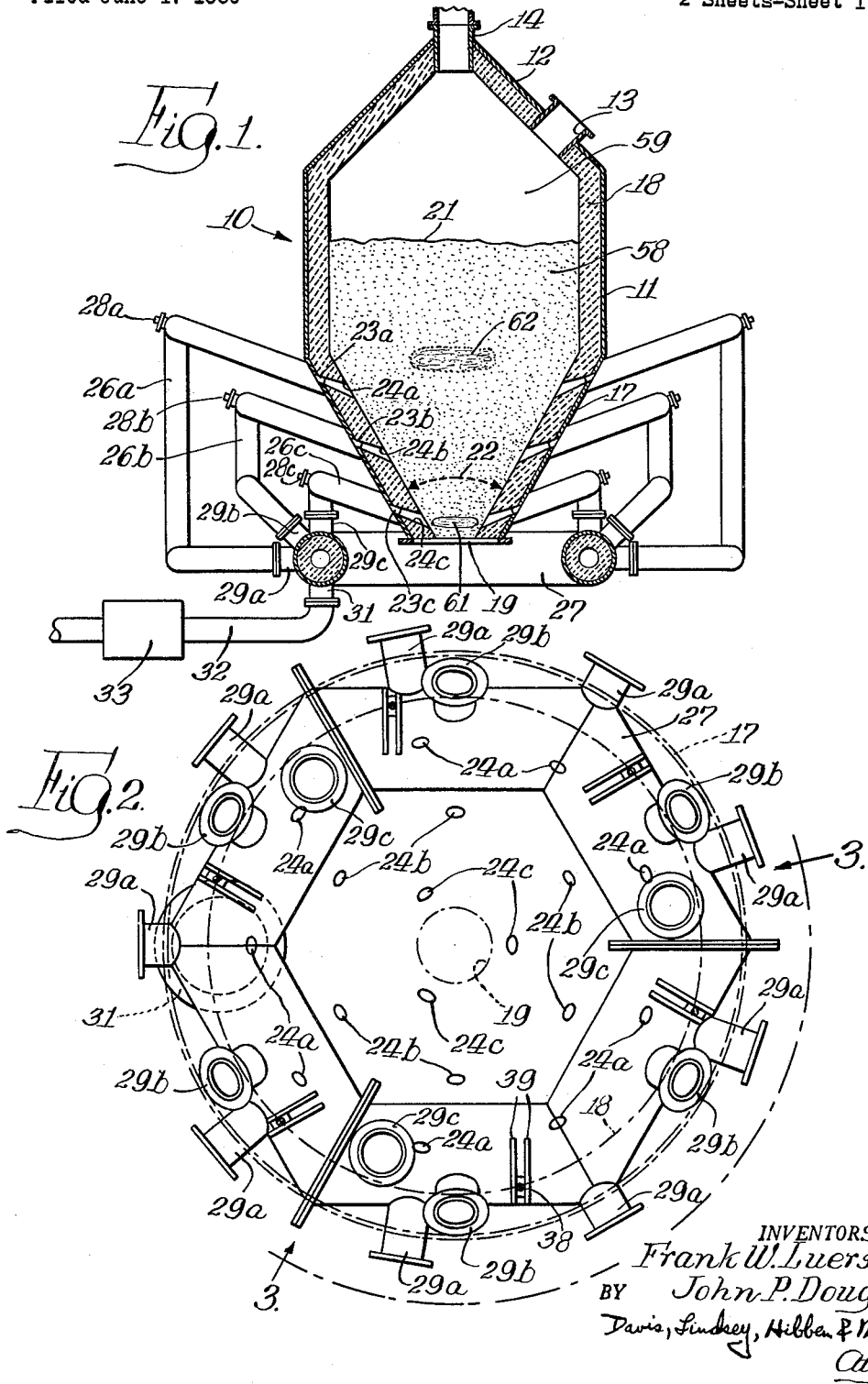

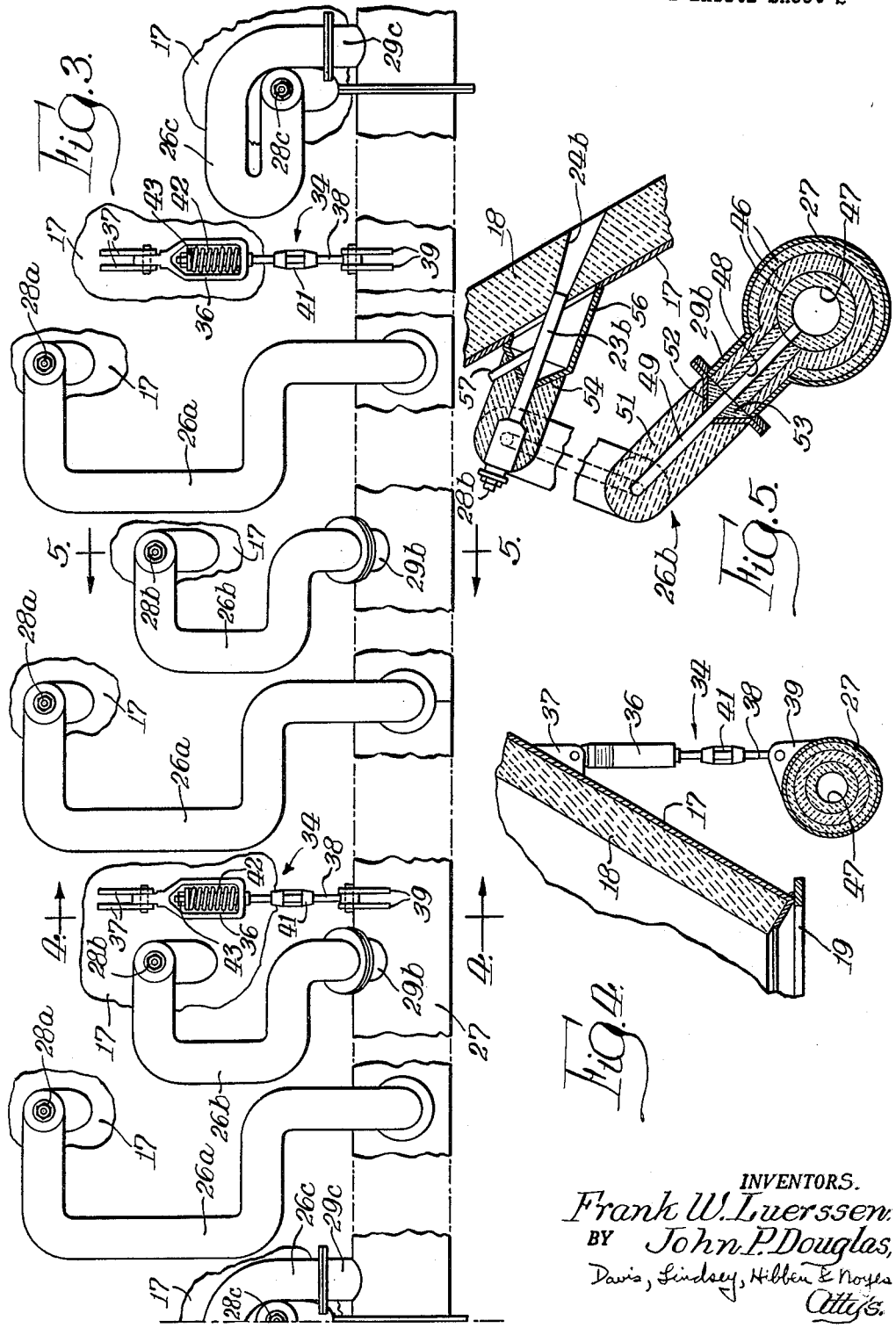

3,093,450
GAS-SOLID CONTACT IN A NON-FLUIDIZED SYSTEM
Frank W. Luerssen, Munster, Ind., and John P. Douglas, Calumet City, Ill., assignors to Inland Steel Company, Chicago, Ill., a corporation of Delaware
Filed June 1, 1960, Ser. No. 33,239
12 Claims. (Cl. 23—1)

This invention relates to the contacting of fluids with solids and more particularly to improvements in contacting gases with solid particles in a non-fluidized system.

In recent years the so-called fluidized bed technique for contacting gases and solids has enjoyed widespread application. A fluidized bed results when a gas is passed upwardly through a bed of suitably sized solid particles at a velocity sufficiently high to buoy the particles and to impart to them a turbulent fluid-like motion but not high enough to sweep the bed out of its container. In other words, the fluidized bed is a relatively stable condition of gas-solid contacting which is intermediate a packed column, on the one hand, and pneumatic transport on the other hand. The fluidized bed has many recognized advantages for certain types of chemical processes. The more important advantages include greater exposure of solid surface by use of small particle sizes, higher reaction rates, more uniform temperature, more favorable heat transfer rates, and ease of transporting fluidized solids.

However, the fluidized bed technique is not always the most favorable method of gas-solid contact. For example, in some reactions it is desirable to provide a temperature or concentration gradient from the inlet to the outlet of the reaction zone but such condition is not feasible in a fluidized zone wherein a more or less homogeneous condition tends to exist throughout. Likewise, there are other conditions or requirements which in a particular application may dictate the use of a non-fluidized gas-solid contact method. As described in more detail below, one such instance is found in the direct reduction of iron oxide ore using a reducing gas containing carbon monoxide and hydrogen. In this process the reduction of iron oxide proceeds in a stepwise manner involving different equilibrium conditions. However, because of the aforementioned homogeneous character of a fluidized solids bed, it is not possible to obtain the most efficient utilization of reducing gas in a single fluidized bed reaction zone, and the use of several fluidized beds would be too expensive.

If for one reason or another the fluidized bed technique cannot be used, the only alternative gas-solid contact schemes are the well known fixed bed and moving bed methods. Where the solid particles are chemical reactants, as in the case of iron ore reduction, the moving bed technique is obviously most desirable so as to provide a substantially continuous operation. However, the major difficulty with the moving bed technique, wherein the gas velocities employed are less than those required for fluidization, is the rather mediocre gas-solid contact that is usually characteristic of this method as heretofore employed.

Accordingly, a primary object of the present invention is to improve the degree of gas-solid contact obtainable in a moving bed operation wherein a gas is passed upwardly in countercurrent relation with downwardly flowing solid particles, the gas velocity being less than that required for fluidization of the solid particles.

A further object of the invention is to provide a novel apparatus for realizing such improvement.

Another object of the invention is to provide a novel method for obtaining such improvement.

An additional object of the invention is to provide an improved process for effecting direct reduction of an iron oxide ore by contacting the same with a reducing gas.

Other objects and advantages of the invention will become apparent from the subsequent detailed description taken in conjunction with the accompanying drawing, wherein:

FIG. 1 is a generally schematic view, partly sectional and partly elevational, of an apparatus suitable for practicing the invention;

FIG. 2 is an enlarged plan view of the bustle pipe portion of the apparatus shown in FIG. 1 with certain other parts being illustrated in phantom lines;

FIG. 3 is a developed elevational view taken along the arcuate line 3—3 of FIG. 2 with the tuyere connections added;

FIG. 4 is a fragmentary sectional view as seen along the line 4—4 of FIG. 3; and FIG. 5 is a fragmentary sectional view as seen along the line 5—5 of FIG. 3.

In the conventional moving bed technique for contacting a gas with subdivided or granular solids, the gas stream is passed upwardly in countercurrent relation through a downwardly gravitating bed of solid particles so that the flow of both gas and solids through the contacting vessel is substantially continuous. The flow rate or velocity of the gas is less than that necessary to impart to the solid particles the upwardly buoyed, turbulent condition referred to as fluidization. In other words, the moving solids bed has substantially the same dense, compact, non-fluidized condition as a fixed bed except for a lesser degree of packing due to movement of the bed.

One of the major problems involved in the contacting of solid particles with gaseous material is obtaining uniform distribution of the gas and thorough contacting of all of the solids with the gas phase. In a countercurrent non-fluidized moving bed operation the gas distribution problem is particularly troublesome because of a tendency toward channeling. For example, in contacting a downwardly moving bed of iron oxide ore particles with an upwardly flowing stream of reducing gas, there is often a tendency for the gas to flow upwardly through a relatively few channels or paths in the moving bed of solid particles with the result that a substantial portion of the iron ore is not adequately contacted with reducing gas and the net result is a very inefficient operation from a chemical or metallurgical viewpoint. In gas-solid contacting techniques generally many different stratagems have been devised to minimize channeling and to obtain proper gas distribution. For example, various devices, including internal grids, perforated plates, bubble cap trays, etc., have been located within the contacting vessel at the lower portion thereof in order to promote uniform distribution of the gas throughout the mass of solid particles. In addition to special precautions taken at the point of gas introduction, it has also been proposed to employ internal baffle arrangements or the like throughout the contacting vessel for preventing channeling and promoting optimum gas distribution.

Although many of these previously proposed schemes may be satisfactory for some purposes, nevertheless, they all involve the provision of various internal structural elements within the contacting vessel and such internal structure presents serious problems. For example, the provision of an internal perforated plate, grid, or screen necessitates either a fluidized operation or a certain minimum particle size for the solid material. A further difficulty arises from the fact that many gas-solid contacting operations, such as the aforementioned reduction of an iron oxide ore, are conducted at elevated temperatures above the allowable operating temperature for steel. Furthermore, iron ore particles are highly abrasive and would tend to cause rapid wear and deterioration of any internal structure in addition to the obvious effect of such structure in retarding the normal gravity flow of the solid iron ore particles. In addition, in an iron ore reduction process of the countercurrent moving bed type the reduction vessel is preferably designed so as to provide a relatively shallow but wide bed of iron ore solids in order to simplify the construction and conserve expense. A bed of such shape inherently complicates the gas distribution problem.

However, we have discovered that greatly improved gas-solid contact can be realized by a particular type of control over the manner and conditions of introduction of the upwardly flowing gas into the contact zone. In brief, we have found that superior gas-solid contact is obtained by pulsating the gas flow and otherwise controlling its introduction so that at the onset of each pulse a flattened gas bubble or pocket is formed at the bottom of the bed of solids which moves slowly upwardly through the bed and collapses at the termination of the pulse. As the bubble moves upwardly through the bed, the solid particles rain or fall downwardly through the gas bubble thereby affording intimate gas-solid contact. The conditions necessary for achieving this result will best be understood by describing a particular apparatus and its operation. Although, the apparatus and method described below pertain to the reduction of iron oxide ore, it is to be understood that the invention is broad in scope and relates to gas-solid contact systems generally.

Referring to the drawing, a reduction vessel 10 is shown for the countercurrent contact of subdivided iron oxide ore with a reducing gas, particularly a mixture of carbon monoxide and hydrogen. The vessel 10 has an outer steel shell with a generally cylindrical central body portion 11 and an upper tapered portion 12 with a discharge outlet 13 for removing effluent reducing gas and a solids feed inlet 14 which is adapted to be connected to a supply source of iron oxide ore particles. The lower end portion of the reduction vessel 10 is in the form of a downwardly converging cone 17. A refractory lining 18 extends throughout the entire internal surface of the steel shell of the vessel. At the lower extremity of the cone-shaped bottom portion 17 an outlet 19 is provided for discharging the reduced iron ore particles.

As will readily be understood, the subdivided iron oxide ore particles are fed into the vessel 10 through the inlet 14 so as to form a downwardly gravitating bed of solid particles which discharge continuously through the outlet 19 at the bottom of the cone-shaped portion. In this instance, the upper level of the bed within the vessel 10 is indicated at 21. The taper or slope of the cone-shaped bottom portion 17 of the vessel must be steep enough to obtain proper gravity flow of solids through the vessel. At the same time, in order to minimize the structural height of the vessel 10, which is desirable from a practical viewpoint, the angle at the apex of the cone must be as wide as possible so as to keep the height of the cone-shaped portion to a minimum. In order to meet both of these requirements, it has been found that the taper angle at the apex, as indicated at 22, should be within the range of from about 45° to about 75°, and preferably about 60°.

To obtain proper distribution of reducing gas throughout the bed of solid particles without the necessity of internal gas distribution structure in the vessel 10, a plurality of tuyers 23a, 23b, and 23c are employed in the cone-shaped bottom portion 17 and are arranged in a predetermined pattern which may vary somewhat is accordance with such factors as the capacity of the vessel, the velocity range of the upwardly flowing gas, and the particle size distribution of the iron ore. As seen in the drawing, the tuyers 23 extend through the outer steel shell and terminate in tapered outlet passages 24a, 24b and 24c provided in the lining 18 so that there is no internal obstruction to downward flow of solid particles through the vessel 10. Preferably, the tuyers 23 and their communicating passages 24 slope downwardly at a slight angle through the vessel wall to prevent any possibility of the tuyers being plugged or clogged by solid particles.

In order to obtain improved gas-solid contact, the tuyers 23 are disposed around the cone-shaped portion 17 in at least three annular or circular groups arranged at respectively different radial and vertical distances relative to the vertical axis of the cone-shaped portion 17. Thus, the distribution pattern of the tuyers 23 is such that the outlet passages 24 are arranged throughout the inner surface of the cone-shaped bottom part of the vessel to provide concentric circular groups, as seen clearly in FIG. 2. Consequently, a plurality of individual streams of reducing gas are injected into the vessel in circumferentially spaced relation and at varying radial distances from the center to the periphery of the bed, the circumferential spacing being such that no tuyer opening is in vertical alignment directly over another tuyers.

Another factor of importance in achieving proper gas distribution is regulation of the gas pressure at the individual tuyers in order to compensate for different degrees of back pressure and resistance to gas flow at the different tuyer locations. For this purpose, the individual tuyers 23a, 23b, and 23c are connected by individual expansion loop connections 26a, 26b, and 26c to a common manifold or bustle pipe 27 and each connection 26 has an adjustable valve 28a, 28b, or 28c. As best seen in FIG. 2, the manifold 27 is in the form of a hexagonal loop encircling the exterior of the vessel 10 and located adjacent the base or outlet 19 of the vessel. The tuyers 23a of the uppermost level (nine in this instance) are supplied with gas through the connections 26a which join the manifold 27 at outlets 29a extending radially outwardly from the manifold. The tuyers 23c of the lowermost level (three in this case) have their connections 26c joined to the manifold 27 by upright outlet stubs 29c extending vertically from the manifold. The intermediate or middle level tuyers 23b (six in this case) communicate through their connections 26b with manifold outlets 29b which extend from the manifold 27 at an intermediate angle (about 45° as shown) between the orientation of the outlets 29a and 29c. The manifold 27 has an inlet 31 which connects to a reducing gas supply line 32 (FIG. 1). In accordance with the principles of the invention, as heretofore briefly mentioned and as described in more detail below, the gas introduced through the tuyers 23 must be pulsated and for this purpose a pulsating device, designated schematically at 33, is provided in the supply line 32. The pulsating device 33 may be of any well known type for imparting a cyclic pulsating pressure to the gas supply stream.

The manifold or bustle pipe 27 is supported from the vessel 10 by means of a plurality of spring suspension devices 34 (FIGS. 3 and 4) spaced around the vessel. Each device 34 comprises a yoke 36 pivotally connected between a pair of flanges 37 on the tapered bottom 17 of the vessel 10 and an elongated hanger rod 38 slidably extending into the yoke 36 and pivotally connected between a pair of flanges 39 on the bustle pipe 27. The hanger rod 38 has a two-piece construction with a turnbuckle or sleeve nut 41 connected therebetween for adjusting the length of the rod, and a compression spring 42 surrounds the projecting end of the rod 38 within the yoke 36 for coaction between the base of the yoke and a washer and nut 43 on the rod.

FIG. 5 shows more detail on one of the tuyere connections 23b—26b—29b. Thus, the bustle pipe 27 has a multiple layer inner refractory lining 46 leaving a center passage 47, and the outlet 29b is similarly lined with a center passage 48. The expansion loop connection 26b comprises a center pipe 49 with external insulation 51. A conical flange 52 surrounds one end of the pipe 49 for connection to the outlet 29b and is packed with insulation, as at 53. The tuyere 23b at the opposite end of the pipe 49 is likewise provided with a conical flange 54 and a tubular extension 56. A pressure tap 57 connects with the tuyere 23b downstream from the flange 54 for instrumentation purposes.

With the apparatus described above we have found that by pulsation of the inlet reducing gas and by control of the flow rate, velocity, and distribution of the gas in the manner described below, the aforementioned bubble phenomenon is obtained which results in highly efficient gas-solid contact. The pulsations induced in the gas stream have, as compared with sound waves, for example, a relatively high amplitude on the order of from about 1 to about 10 p.s.i. and a relatively low frequency ranging from about ¼ to about 4 c.p.s.

Referring to FIG. 1, the bubble phenomenon which constitutes the crux of the present invention will now be described. The vessel 10 is shown as containing a bed 58 of subdivided iron oxide ore particles, it being understood that the solids are supplied more or less continuously through the inlet 14 at the top of the vessel and are withdrawn at the same rate through the outlet 19 at the bottom of the vessel so as to maintain a well defined bed level 21 with a substantial freeboard or gas disengaging space 59 in the upper part of the vessel.

The reducing gas being supplied through the tuyeres 23 is pulsated in the manner previously described and at the start of each pulse an enlarged, generally circular, flat gas bubble or pocket 61 is formed in the bed 58 in the lowermost part of the cone-shaped bottom 17 adjacent the lowermost level of tuyeres or gas inlets 23c. For the duration of the pulse, the gas bubble 61 moves upwardly through the bed and when the pulse is terminated or cut off the gas bubble collapses and disappears, the bubble at this time usually having reached the upper end of the cone-shaped bottom portion of the vessel in the general region indicated at 62 in FIG. 1. As soon as the next successive pulse begins, a new bubble appears at the bottom of the cone and the phenomenon repeats itself with each successive gas pulse. Extended experimental observations using transparent equipment have shown that these gas bubbles are not completely empty or void spaces. On the contrary, as the bubble moves upwardly through the cone-shaped bottom portion of the vessel, ore particles rain or shower downwardly from the top surface of the bubble to its bottom surface thereby providing very intimate gas-solid contact of the ore particles with the gas in the bubble. Because of the frequency with which bubbles are created at the restricted lower end of the cone-shaped bottom 17, it will be understood that substantially all of the solid particles fed to the vessel must pass through one or more gas bubbles before being discharged from the bottom of the vessel.

As each bubble is formed in the bed 58, the volume of the bed expands slightly and it is therefore necessary to have at least some freeboard or expansion space 59 in the upper part of the vessel. In order to allow for normal operating fluctuations as well as upsets in operation, the upper level 21 of the bed is preferably a substantial distance below the inlet 14 to the vessel. Furthermore, it is preferred that the height of the bed 58 be coordinated with the duration of each pulse or pulsation frequency so that at the point of collapse of each bubble, as at 62, the bubble is still below the upper level 21 of the bed. Otherwise, if the bubble completely traverses the height of the bed and collapses at or bursts through the surface of the bed, there will be undesirable blowout or carryover of fine solid particles which tend to accumulate at the bed surface.

The bubble phenomenon herein described is not to be confused with the random or unregulated bubbling action previously observed in fluidized gas-solid contacting operations. For example, in a fluidized bed of solid particles an indiscriminate bubbling action is a characteristic condition wherein gas bubbles form in an irregular and random pattern and pass upwardly through the fluidized bed more or less steadily in the manner of a boiling liquid. In the present invention, however, the bubbles appear and disappear in exact timed relation with the pulsation frequency and each bubble traverses substantially the same upward path along the vertical axis of the cone-shaped bottom portion of the vessel. In a fluidized bed, the random bubbles move rapidly, break through the surface of the bed in a turbulent manner, and have a relatively short duration. In the present invention, the bubbles move more slowly, have a greater duration, and preferably collapse at the end of the respective pulsations so that they do not break through the surface of the bed. The intermittent pulsating bubble phenomenon of the present invention occurs in a generally non-fluidized, compact, moving bed of solid particles and, insofar as we are aware, has never been observed by other in the art.

Experimental investigation of the pulsating bubble phenomenon herein described has shown that a number of requirements must be met in order to obtain the desired condition. First of all, the inlet gas must be pulsated as described above and must be introduced into the contacting vessel in a cone-shaped pattern at not less than three separate levels, as also described above. In addition, however, the velocity of the gas at the tuyere outlets and the velocity through the bed must be controlled within relatively narrow limits in relation to the predetermined minimum fluidization velocity or incipient fluidization velocity for the particular gas and solids involved. The velocity control is achieved by means of the individual tuyere valves 28.

The term "minimum fluidization velocity" as used herein refers to the minimum gas velocity upwardly through the solids bed of a countercurrent gas-solid contact system at which the pressure drop across the height of the solids bed is substantially constant. This value is determined experimentally in a straight column or tube by passing the gas upwardly through the bed of solids and measuring the change in pressure drop across the bed as the superficial gas velocity increases. At the outset, the pressure drop increases with increasing gas velocity, but a gas velocity is finally reached at which the pressure drop becomes substantially constant. At this point the pressure drop due to the average velocity has reached a value substantially equal to the weight of solids per unit of column cross-section and this condition is referred to as the point of "incipient fluidization." Thus, the terms "minimum fluidization velocity" and "incipient fluidization velocity" are interchangeable. At gas velocities greater than the minimum fluidization or incipient fluidization velocity, the gas quantity in excess of that required to initiate fluidization passes up through the bed as the indiscriminate randomly moving bubbles heretofore described as characteristic of a fluidized operation.

The phenomena described above in connection with the explanation of the terms "minimum fluidization velocity" and "incipent fluidization velocity" are well known in the art. For example, reference is made to the book "Fluidization," edited by Donald F. Othmer (Reinhold Publishing Corporation, 1956), pages 10, and 81–86.

In describing the gas velocity conditions necessary to obtain the bubble phenomenon of the present invention, reference will be made to two different gas velocities: (1) the velocity of the individual gas stream as it enters the solids bed, i.e. as the gas emerges from a tuyere 23 and its outlet 24 (this velocity is hereinafter referred to as the "inlet velocity"); and (2) the upward velocity of the total gas through the solids bed at the particular vessel cross-section (this velocity is hereinafter referred to as the "bed velocity").

The inlet velocity of the gas and the bed velocity must be regulated throughout the solids bed, but we have found that the velocities at the lowermost level of gas introduction are particularly critical. First, the total amount of gas introduced at the lowest level (i.e. at the tuyeres 23c) must be such that the bed velocity at this level of the cone is within 10% of the minimum fluidization velocity, i.e. from about 90% to about 110% of the minimum fluidization velocity. Second, the number and size of the gas inlets at the lowest level must be selected so that the on-pulse inlet velocity of each stream is from about 10 to about 20 times the minimum fluidization velocity.

It has been observed that when the inlet velocity at the lowest level of gas introduction is controlled within the aforementioned critical range, a turbulent action of the solid particles is obtained directly in front of each gas inlet opening. Apparently, at the start of each pulse, the specified inlet velocity at the lowermost level of gas inlets causes sufficient turbulence of the solid particles in front of these inlets to open cavities in the bed which merge together to form a bubble. This high velocity condition is believed to be necessary to bubble formation because, otherwise, the succeeding gas flowing into the bed on the remainder of the pulse, even though sufficient to give a bed velocity equal to the minimum fluidization velocity, would immediately diffuse as it rises through the increasing cross-sectional area of the cone and would no longer have a velocity sufficient for fluidization. However, because of the bubble formed at the start of the pulse, vertical diffusion of the inlet gas does not occur. Instead, the succeeding gas entering the bed through the lowest inlets after the initial formation of the gas bubble follows the path of least resistance and travels generally horizontally to the peripheral extent of the bubble before starting to diffuse. In effect, the presence of the gas bubble decreases the cross-sectional area through which the succeeding gas flows, thereby maintaining the gas velocity above that required for fluidization for a longer period of time. As the bubble moves upwardly through the cone-shaped region of the bed, the path of least resistance for the gas entering at the upper levels 23b and 23a likewise comprises a generally radial or horizontal path of travel directly to the rising bubble. Thus, gas is being supplied continuously to the rising bubble to replace the gas which flows out the top of the bubble and through the bed, and the bubble remains enlarged and does not collapse for the duration of the pulse. Immediately upon termination of the pulse, the supply of gas is interrupted and the bubble collapses, assuming that the bed height and pulse duration have been correlated so that the bubble does not break through the upper surface of the bed before the end of the pulse.

Although the flow of gas entering the bed at the lowermost level of gas inlets must be controlled to meet the critical velocity requirements just described, it is also important that the gas flow at all remaining levels of gas introduction above the lowermost level be regulated so as not to exceed the velocity limits specified for the lowest level. More particularly, the bed velocities at all points above the lowest tuyere level and the region of initial bubble formation should be not more than about 60% of the minimum fluidization velocity and preferably not more than 50% of the minimum fluidization velocity. Moreover, the inlet velocity at all such points above the lowest tuyere level should be from about 5 to about 10 times the minimum fluidization velocity.

To summarize, the following conditions will result in the pulsating gas bubble phenomenon in a generally non-fluidized moving bed operation:

(1) The lower portion of the bed must be confined to a cone-shaped configuration and the gas must be introduced at not less than three levels or spaced elevations along the cone. At each level the gas must be introduced through a plurality of circumferentially distributed inlets, preferably such that no two inlets are aligned one above the other in a vertical plane. For most gas-solid systems, the included angle of the cone-shaped region of gas introduction at the bottom of the bed will be from about 45° to about 75°, preferably about 60°.

(2) The inlet gas must be pulsated, preferably at a frequency of from about ¼ to about 4 c.p.s.

(3) At the lowermost level of gas introduction, the on-pulse bed velocity must be from about 90% to about 110% of the minimum fluidization velocity and the on-pulse inlet velocity of each stream must be from about 10 to about 20 times the minimum fluidization velocity.

(4) At all regions above the lowermost level of gas introduction, the on-pulse bed velocity must not be more than about 60% of the minimum fluidization velocity, preferably not more than about 50% of the minimum fluidization velocity, and the on-pulse inlet velocity of each stream must be from about 5 to about 10 times the minimum fluidization velocity.

By operation of a non-fluidized moving bed process in the manner described so as to obtain the pulsating bubble phenomenon, we are able to realize the advantages of a non-fluidized moving bed operation without the usual disadvantage thereof, namely, poor or mediocre gas-solid contact. Thus, the invention maintains the truly countercurrent character of the moving bed process without the homogeneous intermixing tendency of a completely fluidized bed. Consequently, the invention has particular utility in contacting processes in which a composition or temperature gradient through the bed is desirable. Moreover, by providing momentary fluidization conditions in a pulsating manner in a localized region of the bed adjacent the point of discharge of solids from the contacting vessel so as to obtain the bubble phenomenon herein described, we avoid channeling and realize a highly effective degree of gas-solid contact.

Although the invention has been described with particular reference to a certain specific structural embodiment, it is to be understood that various modifications and equivalents may be resorted to without departing from the scope of the invention as defined in the appended claims.

We claim:

1. In the contacting of a downwardly moving non-fluidized bed of solid particles with an upwardly flowing gas, the method of improving gas-solid contact which comprises confining the lower portion of the bed to a cone-shaped configuration, pulsating the inlet gas and introducing the pulsating gas in a plurality of streams spaced circumferentially around the cone-shaped lower portion of the bed and arranged in at least three annular groups at spaced elevations above the bottom of the bed, regulating the introduction of gas at the lowermost of said annular groups so that the on-pulse bed velocity is from about 90% to about 110% of the minimum fluidization velocity and so that the on-pulse inlet velocity of each stream is from about 10 to about 20 times the minimum fluidization velocity, and regulating the introduction of gas at the remainder of said annular groups so that above said lowermost group the on-pulse bed velocity is not more than about 60% of the minimum fluidization velocity and the on-pulse inlet velocity of each stream is from about 5 to about 10 times the minimum fluidization velocity, whereby at the beginning of each pulse a flattened gas bubble is formed in the bed adjacent said lowermost group which rises through the bed during the pulse, the height of said bed being correlated with the pulse frequency so that the bubble collapses at the termination of the pulse before reaching the top of the bed and the gas thereafter passes upwardly through the top of the bed.

2. The method of claim 1 further characterized in that said streams are so spaced that no two streams are aligned one above the other in a vertical plane.

3. The method of claim 1 further characterized in that the included angle of said cone-shaped portion of the bed is from about 45° to about 75°.

4. The method of claim 1 further characterized in that said inlet gas is pulsated at a frequency of from about ¼ to about 4 cycles per second.

5. The method of claim 1 further characterized in that the bed velocity above said lowermost group is not more than about 50% of the minimum fluidization velocity.

6. In the contacting of a downwardly moving non-fluidized bed of solid particles with an upwardly flowing gas, the method of improving gas-solid contact which comprises confining the lower portion of the bed to a cone-shaped configuration having an included angle of from about 45° to about 75°, pulsating the inlet gas at a frequency of from about ¼ to about 4 cycles per second, introducing the pulsating gas in a plurality of streams spaced circumferentially around the cone-shaped lower portion of the bed and arranged in at least three annular groups at spaced elevations above the bottom of the bed, said streams being so spaced that no two streams are aligned one above the other in a vertical plane, regulating the introduction of gas at the lowermost of said annular groups so that the on-pulse bed velocity is from about 90% to about 110% of the minimum fluidization velocity and so that the on-pulse inlet velocity of each stream is from about 10 to about 20 times the minimum fluidization velocity, and regulating the introduction of gas at the remainder of said annular groups so that above said lowermost group the on-pulse bed velocity is not more than about 60% of the minimum fluidization velocity and the on-pulse inlet velocity of each stream is from about 5 to about 10 times the minimum fluidization velocity, whereby at the beginning of each pulse a flattened gas bubble is formed in the bed adjacent said lowermost group which rises through the bed during the pulse, the height of said bed being correlated with the pulse frequency so that the bubble collapses at the termination of the pulse before reaching the top of the bed and the gas thereafter passes upwardly through the top of the bed.

7. The method of claim 6 further characterized in that said angle is about 60°.

8. An apparatus for contacting an upwardly flowing gas stream with a downwardly gravitating bed of subdivided solids comprising a vessel having an upright generally cylindrical portion with a downwardly converging cone-shaped bottom portion, an inlet at the upper end of said cylindrical portion for feeding subdivided solids, an outlet at said upper end for discharging gas, a solids outlet at the lower axial end of said cone-shaped bottom portion, a plurality of gas inlet tuyeres extending through the wall of said cone-shaped bottom portion and spaced circumferentially therearound in a plurality of at least three annular groups arranged at different radial and vertical distances relative to the vertical axis of said cone-shaped portion, each of said groups comprising at least three of said tuyeres, a gas supply manifold connected to said tuyeres, means associated with each of said tuyeres for individually regulating the gas flow through said tuyeres, a gas supply source connected to said manifold, and pulsating means cooperable with said supply source for supplying gas to the vessel under pulsating pressure.

9. The apparatus of claim 8 further characterized in that the included angle at the lower apex of said cone-shaped portion is from about 45° to about 75°.

10. The apparatus of claim 9 further characterized in that said angle is about 60°.

11. The apparatus of claim 8 further characterized in that the interior of said cylindrical portion and said cone-shaped bottom portion are constructed substantially entirely of refractory material and are free of flow-retarding obstructions.

12. The apparatus of claim 8 further characterized in that said tuyeres slope downwardly through the wall of said cone-shaped portion from the exterior to the interior thereof.

References Cited in the file of this patent
UNITED STATES PATENTS

| | | |
|---|---|---|
| 1,852,227 | Barstow et al. | Apr. 5, 1932 |
| 2,443,190 | Krebs | June 15, 1948 |
| 2,793,987 | Brown et al. | May 28, 1957 |
| 2,813,351 | Godel | Nov. 19, 1957 |
| 2,904,410 | Trane | Sept. 15, 1959 |